(12) United States Patent
Kurose

(10) Patent No.: US 7,813,765 B2
(45) Date of Patent: Oct. 12, 2010

(54) RADIO COMMUNICATION SYSTEM AND RADIO COMMUNICATION TERMINAL FOR THE SAME

(75) Inventor: Kengo Kurose, Hamura (JP)

(73) Assignee: Kabushiki Kaisha TOSHIBA, Tokyo (JP)

( * ) Notice: Subject to any disclaimer, the term of this patent is extended or adjusted under 35 U.S.C. 154(b) by 962 days.

(21) Appl. No.: 11/509,546

(22) Filed: Aug. 24, 2006

(65) Prior Publication Data

US 2007/0225040 A1    Sep. 27, 2007

(30) Foreign Application Priority Data

Mar. 24, 2006 (JP) ............................. 2006-084294

(51) Int. Cl.
*H04B 1/38* (2006.01)
(52) U.S. Cl. .................................................... 455/561
(58) Field of Classification Search ................ 455/561, 455/452, 464, 24, 63
See application file for complete search history.

(56) References Cited

U.S. PATENT DOCUMENTS 7,149,486 B2 * 12/2006 Kurose .................... 455/226.2

2006/0084427 A1    4/2006 Kurose

OTHER PUBLICATIONS

A. Jalali et al; Data Throughout of CDMA-HDR A High Efficiency-High Data Rate Personal Communication Wireless System; IEEE International Conference; VTC 2000; pp. 1854-1858.

* cited by examiner

*Primary Examiner*—Dwayne D Bost
*Assistant Examiner*—Joseph Dean, Jr.
(74) *Attorney, Agent, or Firm*—Holtz, Holtz, Goodman & Chick, PC

(57) ABSTRACT

A mobile station compares a third evaluation function value calculated by the same algorithm as an evaluation function calculation algorithm used by a base station and corresponding to a current radio transmission path environment with a second evaluation function value reflecting terminal selection results in a past fixed period notified from the base station. If the third evaluation function value is not less than the second evaluation function value, the mobile station transmits a channel quality indication (CQI) to the base station. In contrast, if the third evaluation function value is smaller than the second evaluation value, the mobile station controls to stop the transmission of the CQI.

13 Claims, 10 Drawing Sheets

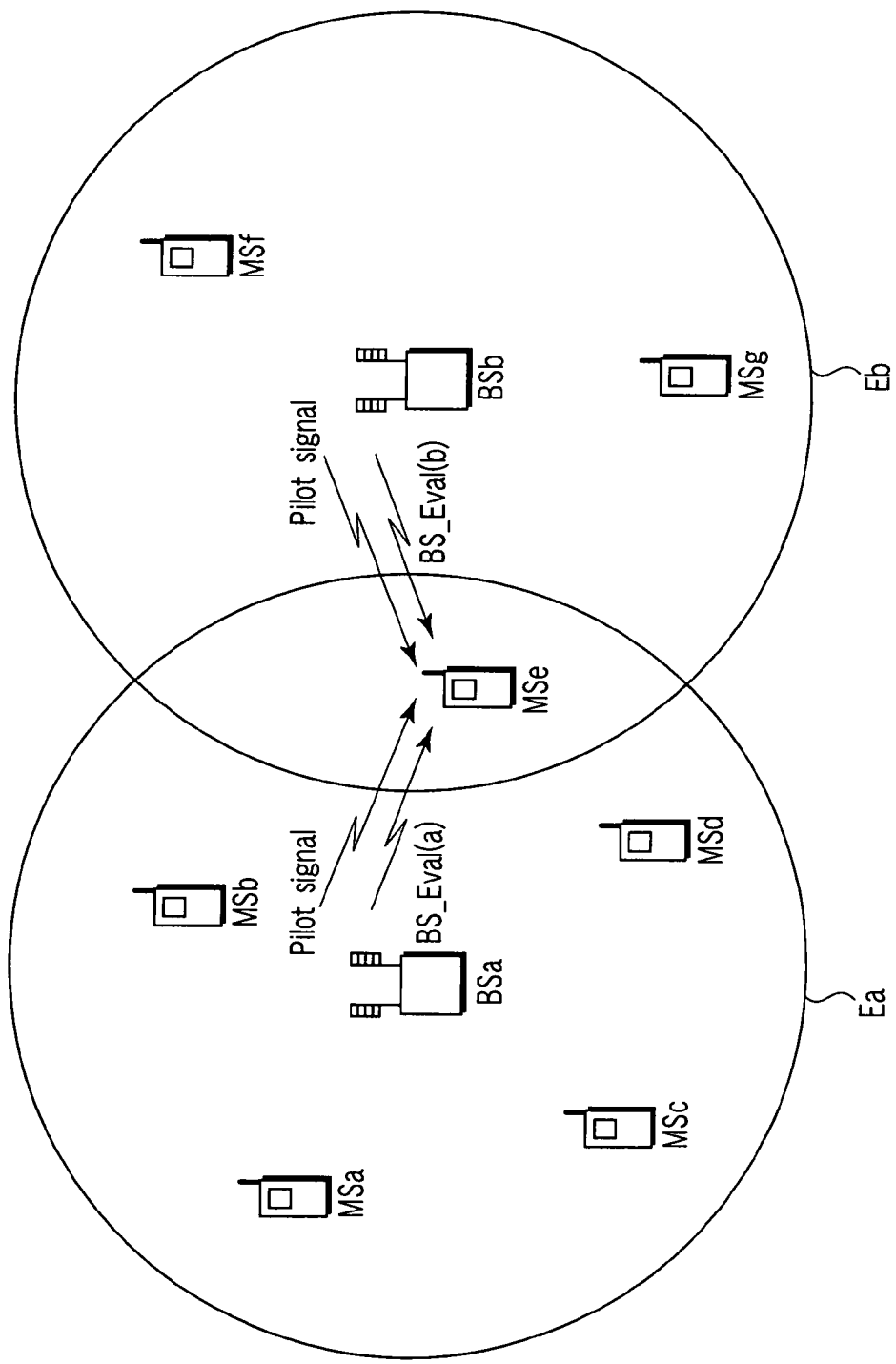
F I G. 1

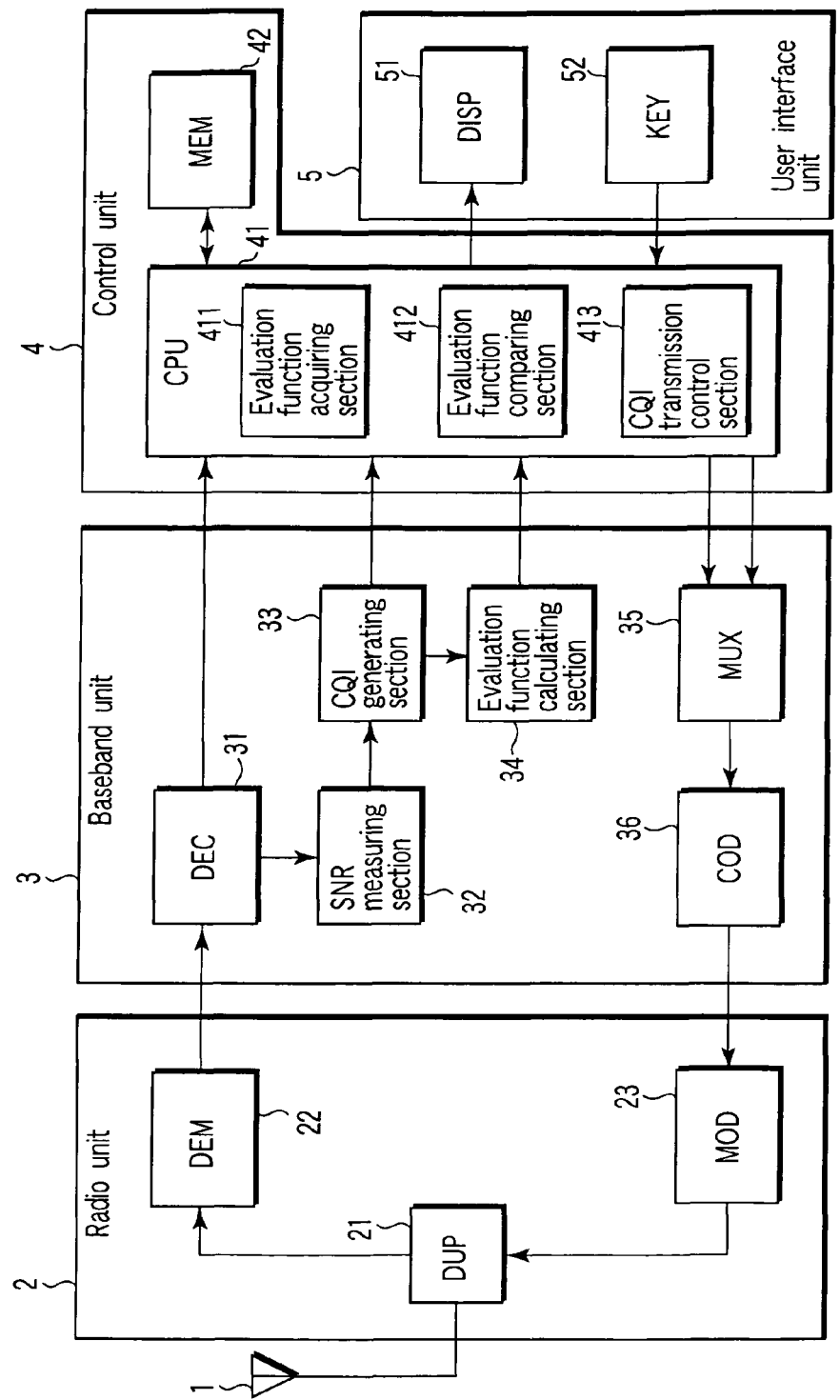
F I G. 2

CQI table

| Base station | CQI |
|---|---|
| BSa | CQI(a) |
| BSb | CQI(b) |

Evaluation function value table

| Base station | Evaluation function value (mobile station) | Evaluation function value (base station) |
|---|---|---|
| BSa | MS_Eval(a) | BS_Eval(a) |
| BSb | MS_Eval(b) | BS_Eval(b) |

| Chunk as CQI transmission candidate | Transmission object ? |
|---|---|
| 3 | O |
| 6 | O |
| 7 | X |
| 10 | O |

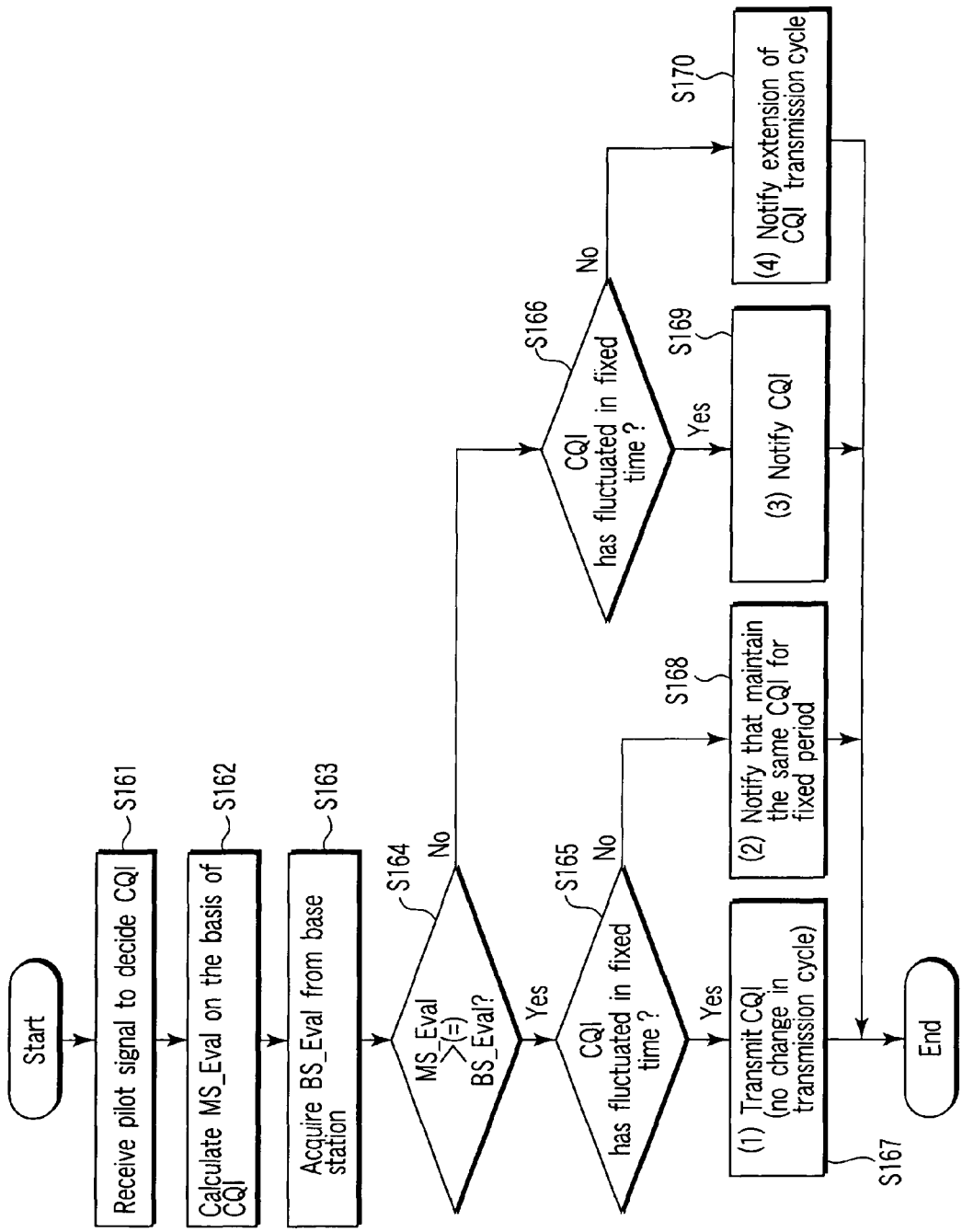
F I G. 16

RADIO COMMUNICATION SYSTEM AND RADIO COMMUNICATION TERMINAL FOR THE SAME

CROSS-REFERENCE TO RELATED APPLICATIONS

This application is based upon and claims the benefit of priority from prior Japanese Patent Application No. 2006-084294, filed Mar. 24, 2006, the entire contents of which are incorporated herein by reference.

BACKGROUND OF THE INVENTION

1. Field of the Invention

The present invention relates to a radio communication system that employs an adaptive modulation scheme, and more particularly to a radio communication system and a radio communication terminal for the same equipped with a scheduler by which a base station selects a radio communication terminal as a communication destination in response to a communication request from a radio communication terminal.

2. Description of the Related Art

A radio communication system that employs a so-called adaptive modulation and coding adaptively controlling a modulation scheme and a channel coding rate performs transmission control between a base station and a radio communication terminal as follows. That is, the radio communication terminal firstly measures reception qualities of downlinks of a plurality of neighboring base stations, respectively, to select a base station with the highest reception quality on the basis of the measured result. The communication system decides a usable transmission format, i.e., a combination of the modulation scheme and the channel coding rate, under the reception quality of the downlink of the selected base station and transmits the decided transmission format as a channel quality indication (CQI) to the selected base station through an uplink. In response to this, the base station uses a dedicated channel for the communication terminal to change over the modulation scheme and the channel coding rate of information data. In this manner, when transmitting the information data from the base station to the communication terminal through the dedicated channel, the base station is able to transmit the information data by using the high data rate that error resistance is low in the high SNR condition at the communication terminal, and in contrast, in the low SNR condition, it becomes possible to transmit the information data by using the low data rate that error resistance is high at the communication terminal.

To perform the forgoing transmission control, the communication terminal or the base station is provided with a table. The table stores a predicted down data communication rate by associating with the reception quality of the downlink. The predicted downlink data rate directly indicates an extremely accurate data rate corrected on the basis of, for instance, statistical data of an error rate, etc., of a predicted or past down data transmission. If the communication terminal is provided with the table, the communication terminal reads out the predicted down data rate corresponding to the down reception quality from the table to notify the predicted down communication rate to the base station. If the base station has the foregoing table, the base station reads out the predicted down data communication rate corresponding to the down reception quality toward the targeted radio communication terminal form the table, based on the CQI information transmitted from the radio communication terminal. As a result, a data communication between the base station and the communication terminal is performed at the communication rate corresponding to the reception qualities at times of the down channel.

By the way, a service form of the communication system employing the aforementioned adaptive modulation and coding rate is generally a best-effort type. Therefore, the communication terminal requires communication only with the base station having the best reception quality of the downlink. The base station transmits a packet of the information data on a preferential basis to a radio communication terminal excellent in the reception quality of the downlink and requiring a high-data rate. A terminal selecting (scheduling) algorithm used by the base station in this case is called a maximum CIR. In the maximum CIR, a radio communication terminal not excellent in the low SNR condition becomes to be placed a low priority to communicate with the base station.

A 1xEV-DO system, which conforms to, for instance, technical specifications "C. S0024 cdma2000 High Rate Packet Data Air Interface Specifications" presented by the standard-setting organization "3GPP2", employs a proportional fairness (PF) scheduler as a scheduler to eliminate the forgoing failure and enhance both throughput seen from the base station side and throughput seen from the radio communication terminal side while keeping balance there between. The PF scheduler takes a data quantity which has been transmitted from the base station to the communication terminal in the past into account in addition to the reception quality of the downlink of the radio communication terminal (for instance, refer to IEEE international conference, VTC 2000 spring, announcement original copy, written by A. Japali, R. Padovani, and R. Pankaj, "Data throughput of CDMA-HDR a High Efficiently-High Data Rate Personal Communication Wireless System").

For example, the base station calculates each evaluation function value "SNR_inst/SNR_ave" for each radio communication terminal, respectively. The "SNR_inst" is an instantaneous signal-to-noise ratio (SNR) of the down link notified from the radio communication terminal to the base station. The "SNR_ave" is an averaged value of the SNRs of the downlinks notified from the communication terminal to the base station in the past. With such a scheduler used, since the communication terminal, of which the downlink reception quality has become excellent, has an increased high potential for being selected, the communication system becomes possible to reduce inequality of throughput for a reception environment among radio communication terminals.

However, since the conventional 1xEV-DO system gives weight the throughput between the radio communication terminal and the base station, the communication terminal makes communications with the base station with the best down reception quality. Therefore, concentrating the communication requests from a large number of radio communication terminals to a specific base station is a possible risk. In such a case, regardless of the level of the possibility to be selected by the base station, all the radio communication terminals transmit the CQIs through uplinks, respectively, so that increases in signaling overhead in the uplinks and in terminal selection processing loads on the base station will be brought.

This problem becomes conspicuous in an orthogonal frequency division multiplex system capable of arranging a plurality of resource blocks even in frequency directions by every section hour.

That is to say, the OFDM system makes communications by using a large number of subcarriers simultaneously. At this moment, each subcarriers can be assigned to individual radio communication terminal. The subcarriers divided into groups are called, for instance, chunk and subcarriers are assigned in chunk to the respective communication terminals. If the aforementioned terminal selecting algorithm is employed to such an OFDM system, the communication terminals measure the reception quality of the downlink for each base station, respectively, to select the base station with the best reception quality. Each communication terminal transmits the measured result for each chunk as the CQIs to the selected base station. In response to this transmission, the bases station decides radio communication terminals to be assigned to each chunk on the basis of the notified CQIs to notify the chunks to be used and transmission formats for information data to the assigned communication terminals through the control channels. After this, in the dedicated channels in the downlinks, each communication terminal receives the information data in the notified transmission format through the notified chunk.

In this way, when the terminal selecting algorithm is employed, the CQIs are transmitted from the communication terminals to the base stations for each chunk. Therefore, the number of transmissions of the CQIs increases in response to the number of chunks, namely the number of resource blocks in the frequency direction. Thus, the signaling overhead on the uplinks from the communication terminals to the base stations increases then a reduction in throughput becomes further conspicuous.

BRIEF SUMMARY OF THE INVENTION

The present invention is invented by paying attention to the aforementioned situations, an object of the invention is to provide a radio communication system and a radio communication terminal for the same, which reduces the number of transmissions of communication requests from a radio communication terminal to a base station to reduce signaling overhead on an uplink, and thereby, intends to improve throughput of the uplink.

As for an aspect of the invention, in a radio communication system including a plurality of radio communication terminals to transmit communication requests in a first cycle to a base station and a base station to calculate first evaluation function values for each radio communication terminal in response to the communication requests at least on the basis of communication qualities to select a radio communication terminal at a communication destination on the basis of the first evaluation function values, the base station newly comprises a means for calculating a second evaluation function value reflecting selection results of the radio communication terminals in a past prescribed period thereto to transmit the second evaluation function value to the plurality of the radio communication terminals at a period longer than the first period. On the other hand, each of the communication terminals comprises a means for calculating a third evaluation function value for a self terminal through the same calculation algorithm as that of the means for calculating the first evaluation function values, compares the calculated third evaluation function value with the second evaluation function value transmitted from the base station and controls the transmissions of the communication requests to the base station on the basis of the comparison result.

Accordingly, in each radio communication terminal, the transmissions of the communication requests are controlled on the basis of the comparison result between the evaluation function value of the self terminal in a current environment and the evaluation function value reflecting terminal selection results in the past fixed period notified from the base station.

Therefore, each communication terminal can transmit the communication request only in the case in which, for instance, the self terminal is easily selected. As a result, it becomes possible to reduce the signaling overheads on the uplink in comparison to a conventional case in which each radio communication terminal transmits communication requests with a fixed period without conditions.

In other words, the present invention can provide a radio communication system and a radio communication terminal for the same which reduces the number of transmissions of the communication requests from the radio communication terminals to the base stations to reduce the signaling overhead in the uplink, thereby, achieves to improve the throughput in the uplink and reduce loads on terminal selection processing in the base stations.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is an exemplary schematic configuration view of a mobile communication system as a first embodiment of a radio communication system regarding the present invention;

FIG. 2 is an exemplary block diagram showing a configuration of a mobile station used in the communication system shown in FIG. 1;

FIG. 16 is an exemplary flowchart showing a CQI transmission control procedure and its control content by a mobile station used in a radio communication system regarding a third embodiment of the present invention.

DETAILED DESCRIPTION OF THE INVENTION

First Embodiment

Figures 3, 4, 5:
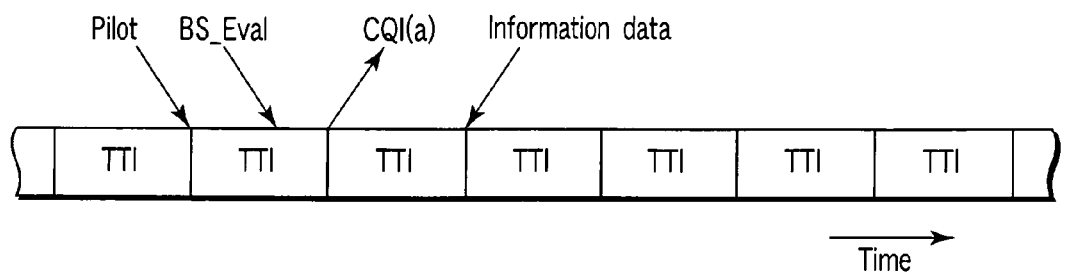
FIG. 3 is an exemplary view showing a channel quality indication (CQI) table configuration provided for the mobile station shown in FIG. 2.
FIG. 4 is an exemplary view showing a configuration of an evaluation function value table provided for the mobile station shown in FIG. 2.
FIG. 5 is an exemplary view showing transmission/reception timing of CQI and information data between a mobile station and a base station.

FIG. 1 is a schematic configuration view of a mobile communication system that is a first embodiment of the radio communication system regarding the present invention.

The communication system of the first embodiment dispersedly arranges a plurality of base stations BSa-BSn (showing only BSa and BSb expediently) in a service area. These base stations BSa-BSn form coverage areas Ea-En, each called a cell, respectively. The communication system connects between the mobile stations MSa-MSg as radio communication terminals and the base stations BSa-BSn via radio channels in the coverage areas Ea-En to enable communications therebetween. The base stations BSa-BSn are connected to a control station (not shown) via cable channels and further connected to an upper tire network such as a cable subscriber network and the Internet from the control station.

By the way, the base stations BSa-BSn are provided with evaluation function calculating functions, terminal selecting functions and evaluation function notifying functions as functions regarding the present invention, respectively.

The evaluation function calculating function calculates evaluation function values for each mobile station MSa-MSg on the basis of channel quality indications (CQIs) transmitted from the mobile stations MSa-MSg. The terminal selecting function selects the mobile station at a data transmission destination in accordance with a scheduling algorithm. As for the scheduling algorithm, both maximum CIR and proportional fairness (PF) are usable.

The maximum CIR preferentially transmits the packet of the information data to the mobile station being excellent in reception quality of the downlink and requiring the high data rate, and uses, for instance, the SNR_inst as the evaluation function. The better the reception quality of the downlink from the base station to the mobile station is, the larger the value of the SNR_inst becomes, and the maximum CIR selects the mobile station with the largest value of the SNR_inst.

The PF scheduler takes an amount of data which has been transmitted by the base station to the mobile station in the past into account in addition to the reception qualities of downlinks of the mobile stations as an index so that the base station selects the mobile station, and uses, for example, SNR_inst/SNR_ave as the evaluation function value. The further the down reception environment is improved, the larger the value of the SNR_inst/SNR_ave becomes, and the PF scheduler selects the mobile station with the highest value of the SNR_inst/SNR_ave.

The evaluation function notifying function calculates an evaluation function value BS_Eval with the selection results of the mobile stations in a past fixed time period reflected thereto on the basis of the information indicating the selection results of the mobile stations MSa-MSg in accordance with the scheduling algorithm. The information indicating the evaluation function value BS_Eval is notified to each mobile station MSa-MSg by using the notification channels on the downlinks. The evaluation function value BS_Eval to be notified may be a result in which the evaluation function value is best low, or may be an average value or a median value of the whole among the mobile stations selected in a past predetermined and fixed time period.

The notifying scheme for evaluation function value may be such a scheme that each base station BSa and BSb notify only the evaluation function values of their self stations, respectively, or notify the evaluation function values of the base stations described in a neighbor cell list altogether. In this case, if the notifying scheme notifies the evaluation function values by including the evaluation function values into notice messages of the existing neighbor cell list, it can reduce signaling overhead of the notification channels in the downlinks. The notifying scheme may notify a parameter having a potential for being varied by a parameter of a network, such as an evaluation function calculation algorithm and an averaged time constant necessary for calculating the SNR_ave together with the foregoing evaluation function values.

On the other hand, each of the mobile stations MSa-MSg is configured as follows. FIG. 2 is a block diagram showing its functional configuration. Each mobile communication terminal MSa-MSg has an antenna 1, a radio unit 2, a baseband unit 3, a control unit 4, and a user interface unit 5.

The radio unit 2 includes an antenna duplexer (DUP) 21, a demodulation circuit (DEM) 22, and a modulation circuit (MOD) 23. Among them, the DEM 22 has a radio part and a demodulating part, amplifies a radio signal received from the antenna 1 and applies filtering to the radio signal by the radio part, then demodulates it by the demodulating part. As for the demodulation scheme, for instance, an orthogonal demodulation scheme is used. The MOD 23 has a modulating part and a radio part. The MOD 23 modulates the radio signal by the modulating part on the basis of the transmission signal output from the baseband unit 3, power-amplifies the modulated radio signal, and then, transmits it toward the base station from the antenna 1 through the DUP 21. As for a modulation scheme, the radio unit 2 prepares a plurality of modulation schemes differing in modulation efficiency, such as a quadrature phase shift keying (QPSK), an 8-phase shift keying (PSK), and a 16-quadrature amplitude modulation (QAM). One of these modulation schemes is selected in response to communication qualities of transmission paths.

The baseband unit 3 has a decoder (DEC) 31, a SNR measuring section 32, a CQI generating section 33, an evaluation function value calculating section 34, a multiplexer (MUX) 35 and a coder (COD) 36 as functions regarding the present invention. These functions of the baseband unit 3 are achieved by, for example, a digital signal processor (DSP).

The DEC 31 applies inverse spread processing to the demodulated signal output from the DEM 22 to reproduce a variety of received signals in the baseband.

The SNR measuring section 32 calculates current signal to noise ratio at the current receiving slots for each base station BSa and BSb.

The CQI generating section 33 decides a transmission format available under the measured values of the SNRs, namely combinations of the modulation schemes and the channel coding rates for each base station BSa and BSb. The CQI generating section 33 then gives the decided transmission formats as the CQIs to the control unit 4. The control unit 4 has a CQI table in a memory section (MEM) 42. The control unit 4 stores CQIs for each base station BSa and BSb decided by the CQI generating section 33 in the CQI table, respectively. FIG. 3 shows an example of the configuration of the CQI table.

The evaluation function calculating section 34 calculates evaluation function values MS_Eval(a) and MS_Eval(b) of self terminals for the respective base stations BSa and BSb under the current radio transmission path environment based on the SNRs calculated by the SNR measuring section 32 and on the CQIs decided by the CQI generating section 33. As for the calculation algorithm, the same algorithm as the calculation algorithm used by the evaluation function calculating functions of the foregoing base stations BSa and BSb. The control unit 4 has an evaluation function value table in the MEM 42. The control unit 4 stores evaluation function values MS_Eval(a) and MS_Eval(b) calculated by the calculating section 34 for each base station BSa and BSb in the evaluation function value table. FIG. 4 shows an example of the configuration of the evaluation function value table.

The multiplexer 35 multiplexes the CQIs and transmission date output from the below-mentioned control unit 4 to supply the multiplexed data to the COD 36. The COD 36 spreads the multiplexed data supplied from the multiplexer 35 by using spreading codes to generate a transmission signal. And the COD 36 supplies the generated transmission signal to the MOD 23 of the radio unit 2.

The user interface unit 5 includes a display (DISP) 51 and an input device (KEY) 52. The DISP 51 consists of, for instance, a liquid crystal display. The KEY 52 consists of a key pad having a dial key and a plurality of function keys.

The control unit 4 has a central processing section (CPU) 41 and the MEM 42. The CPU 41 has an evaluation function acquiring section 411, an evaluation function comparing section 412, and a base station selecting section 413 as its control functions. These control functions are each realized by running a control program stored in the MEM 42 through the CPU 41.

The evaluation function acquiring section 411 receives a notice message of a neighbor cell list transmitted at a period longer than a transmission cycle of the CQIs from the base stations BSa and BSb. The acquiring section 411 then acquires evaluation function values BS_Eval(a) and BS_Eval(b) with the selected results of the mobile stations for the past fixed time period reflected thereto from the received notice message. The acquiring section 411 stores the evaluation function values BS_Eval(a) and BS_Eval(b) acquired from the base stations BSa and BSb, respectively, in the evaluation function value table.

In the case in which the parameters of the calculation algorithm of the evaluating functions and parameters such as an averaged time constant necessary for calculating the SNR_ave together with the evaluation function values BS_Eval (a) and BS_Eval(b) are notified from the base stations BSa and BSb, the acquiring section 411 also stores the notified parameters in the function value table altogether.

As to a base station selected as a transmission object for the CQI, the evaluation function comparing section 412 compares the evaluation function values MS_Eval corresponding to the current radio transmission path environment calculated by the evaluation function calculating section 34 with the evaluation function value BS_Eval notified from the base station. Then the comparing section 412 determines whether an expression MS_Eval≧BS_Eval is satisfied or not.

The CQI transmission control unit 413 controls the transmission of the CQI at the next transmission timing on the basis of determination result from the comparing section 412. For instance, if the expression MS_Eval≧BS_Eval is satisfied, the control unit 413 determines that the self terminal is in a state in which it is appropriate to be selected by the base station and transmits the CQIs. On the contrary, if an expression MS_Eval<BS_Eval is satisfied, the control unit 412 determines that self terminal is in a state in which it is hardly selected and stops to transmit the CQIs.

Figure 6:
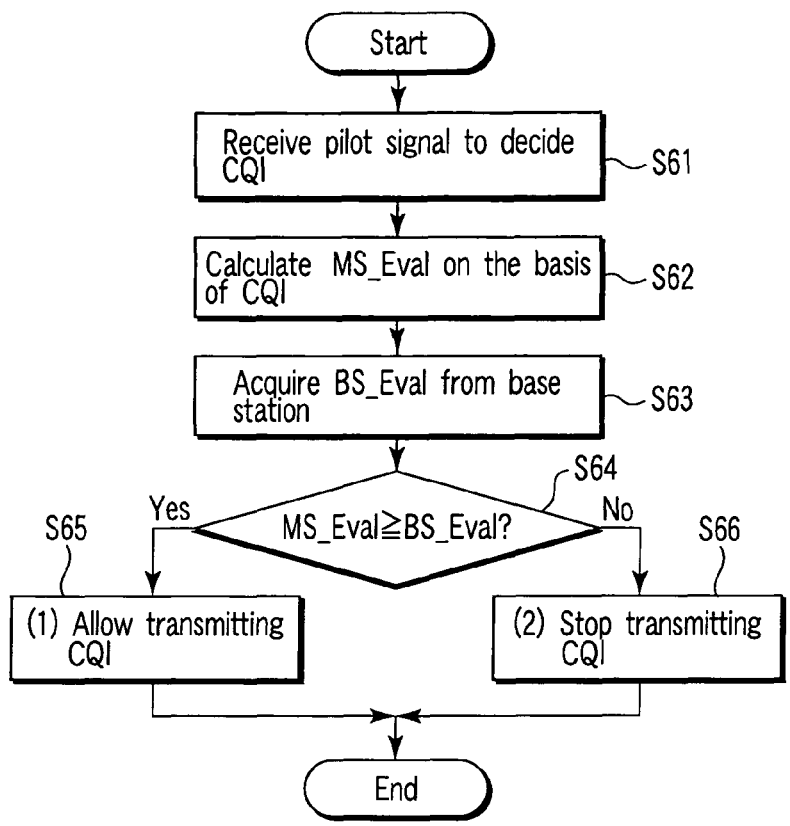
FIG. 6 is an exemplary flowchart showing a CQI transmission control procedure and its control content by the mobile station shown in FIG. 2.

Next to this, CQI transmission control operations in the mobile communication system configured as mentioned above will be described. Here, operations of the mobile station MSe shown in FIG. 1 will be described as an example. FIG. 5 is a timing view showing transmission/reception timing of control data and information data at the mobile station MSe, and FIG. 6 is a flowchart showing a CQI transmission control procedure and a control content by and in the mobile station MSe.

The mobile station MSe transmits/receives the control data and the information data in synchronization with time division multiplexed slot TTIs as shown in FIG. 5. For instance, when a reception period of a certain slot TTI has approached, in step S61, the mobile station MSe firstly receives pilot signal broadcasted from the neighboring base stations BSa and BSb, respectively, to calculate the SNR. The SNR measuring section 32 calculates the SNR at the current receiving slot. The CQI generating section 33 decides a transmission format usable depending on the measured value of the calculated SNR, namely the combination of the modulation scheme and the channel coding rates for each base station BSa and BSb to store the decided transmission formats as the CQIs in the CQI table within the MEM 42.

Sequentially, the mobile station MSe shifts to step S62 then the evaluation function calculating section 34 calculates the evaluation function values MS_Eval(a) and MS_Eval(b) of the self terminal for the base stations BSa and BSb under the current radio transmission environment, based on the SNRs. The mobile MSe then stores the calculated evaluation function values MS_Eval(a) and MS_Eval(b) in the evaluation function value table within the MEM 42.

Next, in step S63, the mobile station MSe receives the notice message of the neighbor cell list from the base station BSa and BSb in the same slot at which, for example, the pilot signal has been received. The mobile station MSe then acquires the evaluation function values BS_Eval(a) and BS_Eval(b) from the received message. These evaluation function values BS_Eval(a) and BS_Eval(b) are values calculated by the base stations BSa and BSb, respectively, so that the selection results of the mobile stations in a past fixed time period are reflected thereto.

With the evaluation function values BS_Eval(a) and BS_Eval (b) acquired, the mobile station MSe, in a step S64, selects either the base station BSa or BSb on the basis of the measured values of the SNRs. The mobile station MSe compares the evaluation function value MS_Eval calculated by the evaluation function calculating section 34 and corresponding to the current radio transmission path environment with the evaluation function value BS_Eval notified from the base station to determine whether the expression MS_Eval≧BS_Eval is satisfied or not. For instance, if the base station BSa is selected, the mobile station MSe determines whether the expression MS_Eval≧BS_Eval is satisfied or not. And as the determination result, if the expression MS_Eval≧BS_Eval is satisfied, the mobile station MSe determines that there is a large possibility of being selected by the base station BSa to shift to step S65, where it reads the CQI for the base station BSa from the CQI table to transmit it to the base station BSa.

The base station BSa calculates the evaluation function values for each mobile station MSa-MSe on the basis of the CQIs transmitted from each mobile station MSa-MSe present in a coverage area Ea formed by the self station. The base station BSa selects a mobile station at the information data transmission destination in accordance with scheduling algorithm on the basis of the evaluation function values. As shown in FIG. 5, after a period by one TTI (for instance, 0.83 msec at ½ slot in EV-DO system) has elapsed, the base station BSa transmits the information data through the dedicated channel toward the selected mobile station.

Figure 7:
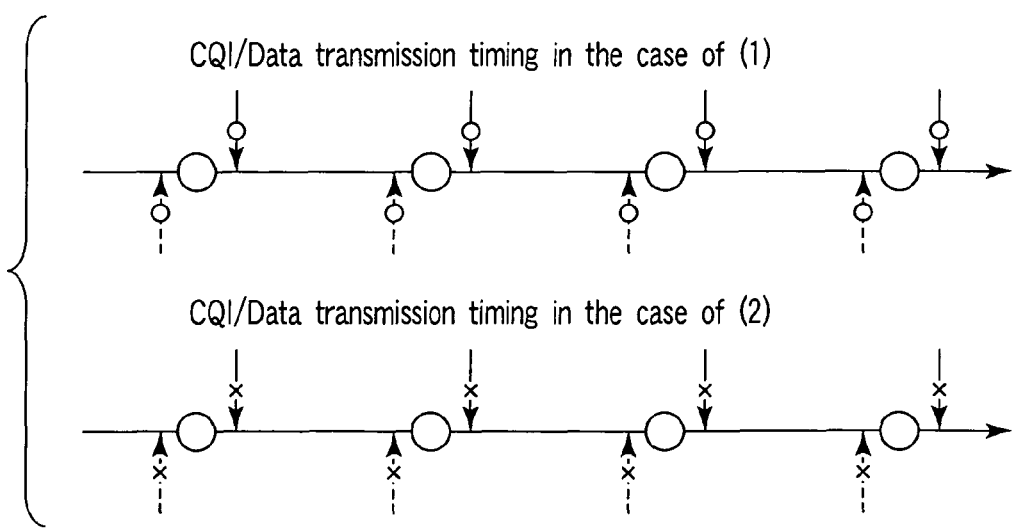
FIG. 7 is an exemplary view for explaining a transmission/reception operation of CQI and information data by the CQI transmission control shown in FIG. 6.

For example, if the base station BSa has selected the mobile station MSe, the base station BSa transmits the information data to the mobile station MSa. After that time, in a similar manner, the foregoing terminal selection processing is repeated at every time when the CQIs are transmitted from the mobile stations MSa-MSe in fixed cycles from the mobile stations MSa-MSe and the information data directed to the selected mobile station is transmitted. FIG. 7(a) shows an operation in the case in which the determination result in FIG. 6 has resulted in the determination (1). Each mark "O" on a lower side in FIG. 7(a) indicates a CQI transmission, and each mark "O" on an upper side in FIG. 7(a) indicates an execution of processing of monitoring whether or not the base station has selected its self terminal.

In contrast, it is presumed that the mobile station MSe determines that the expression MS_Eval<BS_Eval is established as the comparison result in step S64. In the case, the mobile station MSe determines that there is a small possibility in which the self terminal MSe is selected by the base station BSa, and shifts to step S6 to stop the transmission of the CQI at the next CQI transmission scheduled timing. FIG. 7(b) shows an operation in the case in which the determination result in FIG. 6 has resulted in the determination (2). Each mark "X" on a lower side in FIG. 7(b) indicates non-transmission of the CQI, and each mark "X" on an upper side in FIG. 7(b) indicates non-execution of processing of the monitoring whether or not the base station has selected its self terminal.

In the case where the mobile station MSe uses the PF scheduler as the scheduling algorithm, since the calculation of the averaged value of the CQIs is required, the mobile station MSe cannot stop the transmission of the CQI simply. Therefore, in such case, the mobile station MSe may transmit a flag declaring that it does not request an dedicated channel in a slot period TTI in this time together with the CQI instead of not transmitting the CQI. This transmission can be achieved because the mobile station MSe has the same evaluation function calculating scheme as that of the base station.

As mentioned above, in the first embodiment, the mobile stations MSa-MSg compare the evaluation function values MS_Eval corresponding to the current radio transmission path environment with the evaluation function values BS_Eval notified from base station BSa and BSb. The evaluation function values MS_Eval are the values calculated by the same algorithm as those of the evaluation function value calculation algorithm used by the base stations BSa and BSb in the mobile stations MSa-MSg. The evaluation function values BS_Eval are the values with the terminal selection results in the past fixed time period reflected thereto. And if the expression MS_Eval≧BS_Eval is established, the CQIs are transmitted to the base station BSa, in contrast, if the expression MS_Eval<BS_Eval is established, the transmission of the CQIs are stopped.

Accordingly, the mobile station, in which the expression MS_Eval<BS_Eval is satisfied, does not transmits the CQI. Therefore, even if a large number of mobile stations MSa-MSe are present in the coverage area Ea of the base station BSa as shown in FIG. 1, the signaling overhead at the uplink is reduced in number, the throughput of the uplink is improved. At this moment, in the mobile station which has stopped the transmission of the CQIs, the power consumption is reduced by the amount of non-transmission of the CQIs. Further, it becomes no need to monitor arrivals of the information data directed to itself. Thereby, it becomes possible to achieve increased battery life. On the other hand the base station BSa may reduce the number of receptions of the CQIs transmitted from the mobile stations MSa-MSe. As a result, the number of mobile stations to be objects of the calculation processing of the evaluation function values and the terminal selection processing is decreased, and then, the processing loads are reduced to that extent of the decrease of the number of the mobile stations.

Second Embodiment

A second embodiment of the present invention is embodied by applying this invention to an OFDM system having a plurality of resource blocks for each section time in a downlink from a base station to a mobile station.

Figure 8:
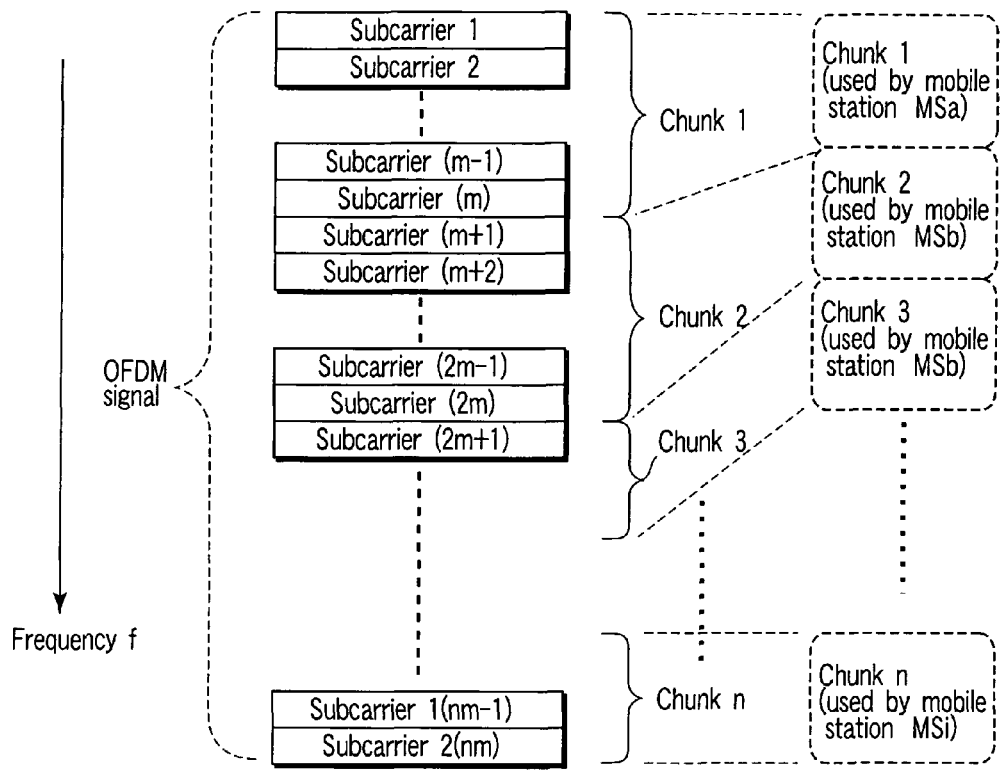
FIG. 8 is an exemplary view showing an arrangement of subcarriers and chunks in an orthogonal frequency division multiplex (OFDM) system.

The OFDM system arranges, for instance, a number of subcarriers 1-(nm) in a frequency direction f as shown in FIG. 8. These subcarriers 1-(nm) are grouped for each m piece, thereby, n pieces of chunks 1-n are constituted. The subcarriers are assigned to the mobile stations MSa-MSg for each of the chunks 1-n. A single piece of chunk is sometimes assigned to one mobile station, and a plurality of chunks are sometimes assigned to one mobile station simultaneously.

Figure 9:
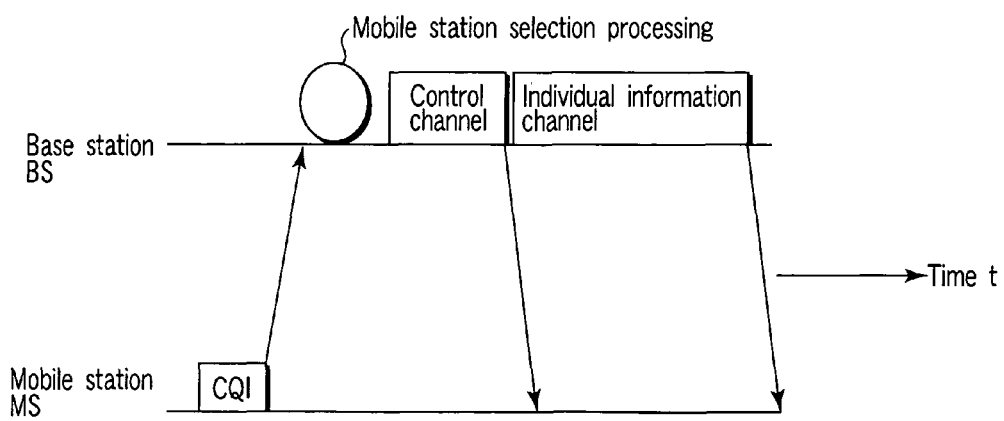
FIG. 9 is an exemplary view showing a transmission/reception timing of control data and information data between a base station and a mobile station when a scheduling algorithm for a terminal selection is applied to the OFDM system.

In such an OFDM system, it is presumed that a scheduling algorithm for terminal-selecting, such as a Maximum CIR or a PF scheduler, is applied. The mobile stations MSa-MSg measure radio transmission path qualities for each chunk of the downlinks for each neighboring base station, respectively, to select the base station best excellent in reception quality, respectively. The mobile stations MSa-MSb then transmit the measured results of the radio transmission qualities for each chunk as CQIs as shown in FIG. 9. On the other hand, the base stations BSa and BSb decide the mobile stations MSa-MSb to be assigned to each chunk in accordance with the scheduling algorithm on the basis of the notified CQIS. Then, the base stations BSa and BSb notify numbers of chunks to be used and the transmission formats of the information data to the decided mobile stations via a control channel as shown in FIG. 9. The mobile stations MSa-MSg use the notified chunks and also receive to decode the information data transmitted from the base stations BSa-Bsn in the notified transmission formats, in dedicated channels of the downlinks in accordance with the notified information.

Figure 10:
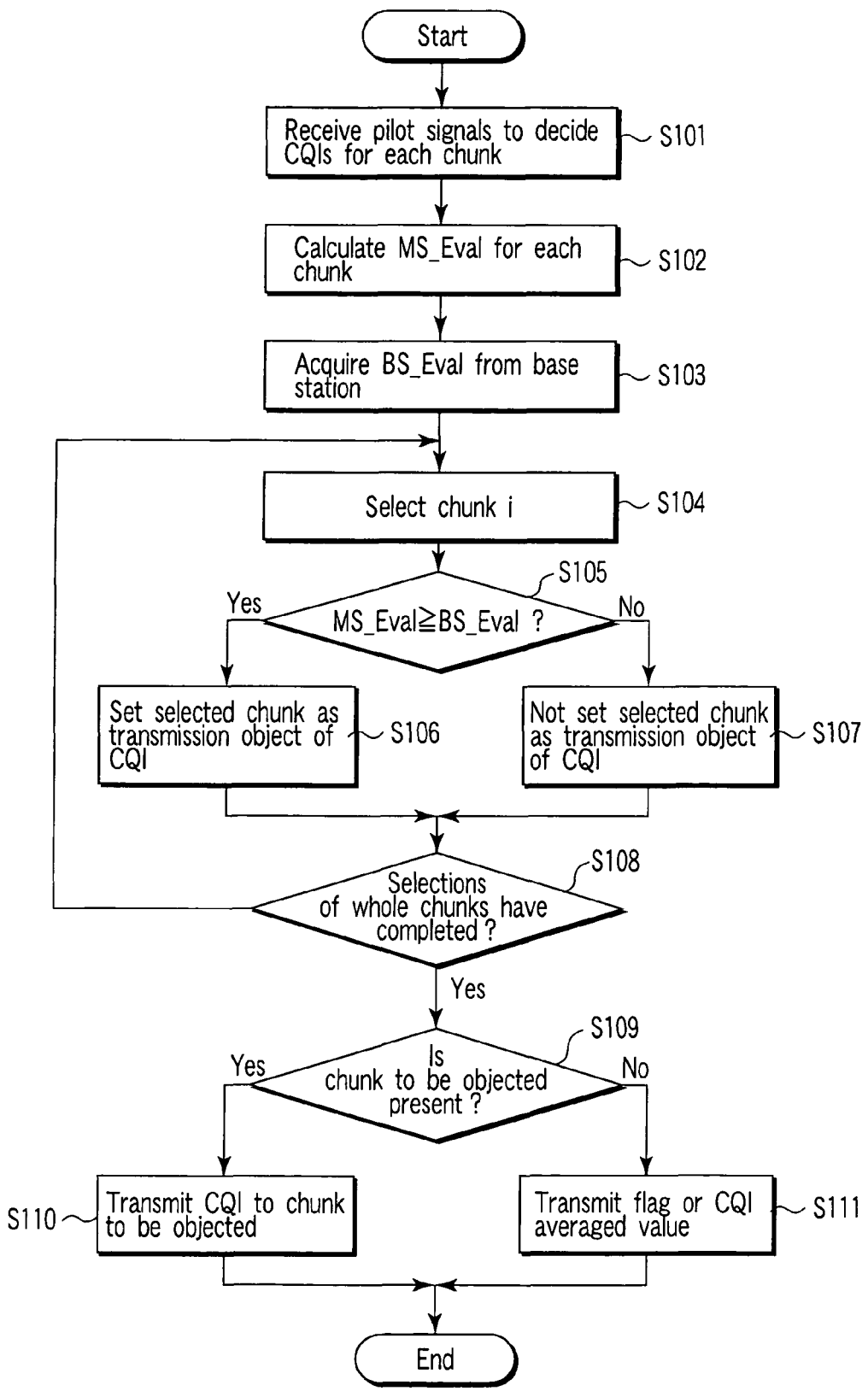
FIG. 10 is an exemplary flowchart showing a CQI transmission control procedure and its control content by a mobile station used in a radio communication system regarding a second embodiment of the present invention.
Figure 11:
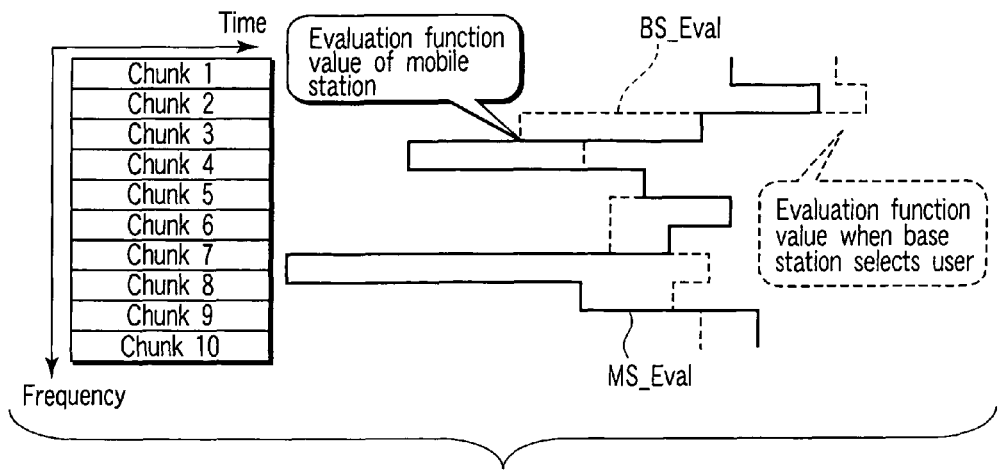
FIG. 11 is an exemplary view for explaining a first operation example of the CQI transmission control shown in FIG. 10.

Meanwhile, when transmitting/receiving the CQIs and the information data, the mobile station MSe executes the following control. FIG. 10 is a flowchart showing its control procedure and control content, and FIG. 11 is a view used for its operation explanation.

That is, in step S101, the mobile station MSe firstly receives the pilot signals broadcasted for each chunk from the base stations BSa and BSb to calculate the Ec/Io (ratio of pilot signal strength to whole received signal strength). The mobile station MSe then calculates the SNR of each chunk for each base station BSa and BSb. Further, the mobile station MSe decides, for each chunk, the transmission formats, namely the combinations of the modulation schemes and the channel coding rates which are usable under the measured values of the calculated SNRs. The mobile station MSe then stores the decided transmission formats for each chunk as the CQIs in the CQI table in the MEM 42.

Sequentially, the mobile station MSe shifts to step S102 to calculate the evaluation function values MS_Eval(a) and MS_Eval(b) of the self terminal under the current radio transmission environment depending on the CQIs of each chunk for each base station BSa and BSb. The calculated evaluation function values MS_Eval(a) and MS_Eval(b) are stored in the evaluation function value table in the MEM 42.

Next to this, the mobile station MSe receives the notice message of the neighbor cell list from the base stations BSa and BSb in step S103, for instance, in the same slot as the slot which has received the pilot signal. The mobile station MSe acquires the evaluation function values MS_Eval(a) and MS_Eval(b) of each chunk from the received message. The acquired evaluation function values MS_Eval(a) and MS_Eval(b) are stored in the evaluation function value table in the MEM 42. The evaluation function values MS_Eval(a) and MS_Eval(b) are respective ones calculated so that the selection results of the mobile stations BSa and BSb in the past fixed time period for each chunk are reflected, respectively.

Now, when the evaluation function values MS_Eval(a) and MS_Eval(b) are acquired, the mobile station MSe selects either one of the base stations BSa and BSb, based on the measured values of the SNRs. For instance, the base station BSa or BSb which has a larger averaged value of the SNRs is selected. It is supposed that the base station BSa has been selected. Then, for the selected base station BSa, at every selection of a single chunk in step S104, the mobile station MSe compares the evaluation function value MS_Eval(a) calculated thereby and corresponding to the current transmission path environment with the evaluation function value BS_Eval(a) in step S105. The mobile station MSe then determines whether or not the expression MS_Eval(a)≧BS_Eval (b) is established. As the determination result, if there is any chunk in which the expression MS_Eval(a)≧BS_Eval(b) is established, the chunk is determined as a chunk with a high possibility of being selected by the base station BSa. The mobile station MSe makes a shift to step S106 to store the numbers of the chunks as the chunks of CQI transmission objects in the MEM 42.

On the contrary, for the chunk in which the expression MS_Eval(a)<BS_Eval(b) is satisfied as the comparison result, it is determined that there is a low possibility at which the self terminal MSe is selected by the base station BSa. The mobile station MSe then shifts to step S107 to exclude the determined chunk from the chunks of CQI transmission objects.

For instance, it is assumed that there are 10 pieces of chunks and the comparison results of the ratios between the evaluation function value MS_Eval(a) calculated by the mobile station and the evaluation function value BS_Eval(a) notified from the base station for these chunks 1-10 are shown in FIG. 11. In this case, the chunks in which the expressions MS_Eval≧BS_Eval are each satisfied are chunks 3, 6, 7 and 10. These numbers of the chunks are stored as the chunks of which the CQIs are to be transmitted in the MEM 42 as shown in FIG. 12, and chunks other than those chunks 3, 6, 7 and 10 are excluded from the chunks of the CQI transmission objects.

Thus, after completing comparison determination processing for all the chunks 1-10, the mobile station MSe shifts from step S108 to step S109, where it determines the presence or absence of the chunks of the CQI transmission objects. If the chunk numbers of the CQI transmission objects are stored in the MEM 42, the mobile station MSe shifts to step S110 to transmit the CQIs of the corresponding chunks for the chunks of which the numbers has been stored. For instance, if the chunk numbers 3, 6, 7 and 10 have been stored in the MEM 42 as shown in FIG. 12, the CQIs regarding the chunks 3, 6, 7 and 10 are transmitted.

Figure 12:
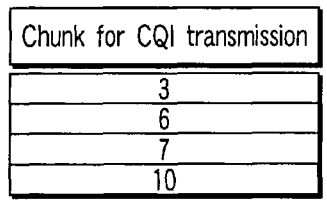
FIG. 12 is an exemplary view showing an example of a chunk selected as a CQI transmission object in the first operation example of the CQI transmission control shown in FIG. 10.
Figure 13:
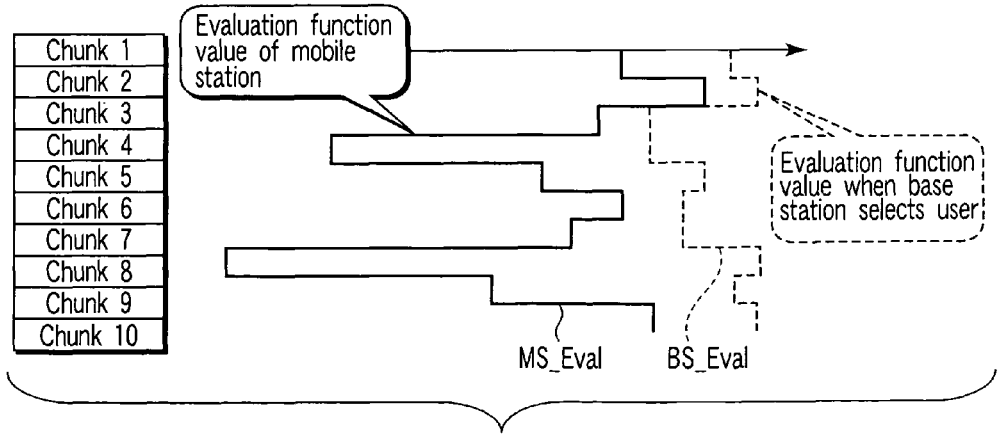
FIG. 13 is an exemplary view showing an example of the case in which any chunk has not selected as the CQI transmission object by the CQI transmission control shown in FIG. 10.

In contrast, as the determination result in step S109, for example, as shown in FIG. 12, it is presumed that the expression MS_Eval<BS_Eval are satisfied in all chunks and as a result, any chunk number of the CQI transmission objects is not stored in the MEM 42. In such a case, the mobile station MSe shifts to step S111, where it transmits a flag declaring non-transmission of the CQIs in the slot period TTI of this time. Or the mobile station MSe transmits the averaged value of the CQIs together with the CQIs in the next transmission of the CQI or transmits a flag declaring non-request for dedicated channels together with the transmission of the CQIs. If the scheduling algorithm used by the base station is not a scheduler such as a PF scheduler calculating the average of the CQIs, there is no need to transmit the aforementioned flag or the averaged value of the CQIs.

As described above, in the second embodiment, the evaluation function value MS_Eval which is corresponded to the current radio transmission path environment and calculated by the mobile station itself is compared with the evaluation function value BS_Eval notified from the base station and reflecting the terminal selection results thereto in the past fixed time period notified from the base stations MSa-MSe for each chunk that is the resource block in the mobile base stations MSa-MSe. The chunks in which the expressions MS_Eval≧BS_Eval are satisfied are selected as the chunks of the CQI transmission objects and the CQIs are transmitted for these selected chunks. On the contrary, for the chunks in which the expression MS_Eval<BS_Eval are satisfied are excluded from the CQI transmission objects and those CQIs are not transmitted.

Accordingly, the CQIs are transmitted only for the chunks in which the expressions MS_Eval≧BS_Eval are satisfied. Therefore, in comparison with the case where the CQIs for all the chunks are transmitted without any condition, the number of the transmissions of the CQIs and the signaling overheads in the uplink can be decreased and the throughput in the uplink can be improved.

Further, in the second embodiment, the mobile station MSe transmits the flag declaring of non-transmission of the CQIs together with the CQIs for the chunks in which the expression MS_Eval<BS_Eval are satisfied, or transmits the averaged value of the CQIs instead of the elimination of the transmissions of the CQIs when transmitting the CQIs. Thereby, even when the scheduling algorithm used by the base stations BSa and BSb use the scheduler such as the PF scheduler calculating the average of the CQIs, the mobile station MSe does not cause any failure. In this case, although a reduction effect of the signaling overheads in the uplink is decreased, in the base stations BSa and BSb, the loads on the terminal selection processing are reduced, and furthermore, in the mobile stations MSa-MSg, determinations of the presence or absence of the information data directed to the self terminal becomes useless, so that the decrease in power consumption in the mobile stations MSa-MSg is achieved.

In the second embodiment, although the CQIs are transmitted for all the chunks in which it is determined that the expressions MS_Eval≧BS_Eval have been established. However, the present invention is not limited to that case, it may be configured to set an upper limit value of the number of chunks for the CQI transmission objects in advance, and when the number of the chunks in which it is determined that the expressions MS_Eval≧BS_Eval have been established exceeds the upper limit value, the chunks up to the upper limit value in order of magnitude of the difference between MS_Eval and BS_Eval may be selected and the CQIs may be transmitted regarding the selected chunks.

Figures 14, 15:
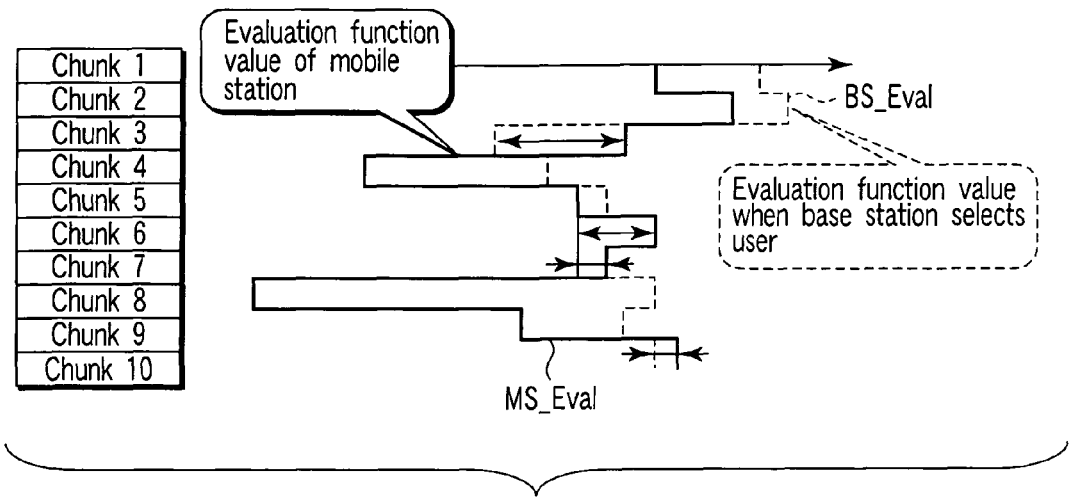
FIG. 14 is an exemplary view for explaining a second operation example of the CQI transmission control shown in FIG. 10.
FIG. 15 is an exemplary view showing an example of a chunk selected as a CQI transmission object in the second operation example of the CQI transmission control shown in FIG. 10.

FIG. 14 and FIG. 15 are views for each explaining operations of the CQI transmission control. FIG. 14 and FIG. 15 each show examples in which three chunks 3, 6 and 10 in top three in order of magnitude of the reference between MS_Eval and BS_Eval are selected from among the chinks 3, 6, 7 and 10 in which the expression MS_Eval≧BS_Eval are satisfied. With such a manner, the mobile station MSe can suppress the number of transmissions of the CQIs in the case that the number of the chunks in which the expressions MS_Eval≧BS_Eval are satisfied is large, therefore, the mobile terminal can maintain the reduction effect on the signaling overheads in the uplink high.

Third Embodiment

A third embodiment is constituted so as to control the transmissions of the CQIs with the presence or absence of fluctuations in the CQIs in a fixed time in mind in addition to a comparison result between an evaluation function value MS_Eval in response to a current radio transmission path environment calculated by the mobile station itself and an evaluation function value BS_Eval which is notified from the base station and reflects a terminal selection result in a past fixed time period.

The third embodiment will be described in an example that it has one piece of resource block at every section time in a similar way of the foregoing first embodiment. FIG. 16 is a flowchart showing a CQI transmission control procedure and a control content by the mobile station regarding the third embodiment, and FIGS. 17(a)-(d) is a view showing a result of the CQI transmission control in FIG. 16.

When the mobile station MSe reaches a reception period of a slot TTI, in step S161, the mobile station MSe firstly receives pilot signals broadcasted from the neighboring base stations BSa and BSb, respectively, to calculate an Ec/Io (ratio of pilot signal strength to whole received signal strength). The mobile station MSe then calculates a ratio (SNR) at a current receiving slot for each base station BSa and BSb on the basis of the calculated Ec/Io. Further, the mobile station MSe decides combinations transmission formats usable under the measured value of the calculated SNR, namely combinations of the modulation scheme and channel coding rates for each base station BSa and BSb to store the decided transmission formats as the CQIs in the CQI table in the MEM 42.

Sequentially, the mobile station MSe shifts to step S162 to calculate the evaluation function values MS_Eval(a) and MS_Eval(b) of their self terminals for the base stations BSa and BSb in the current radio transmission environment, respectively, based on the CQIs. The mobile station MSe stores the calculated evaluation function values MS_Eval(a) and MS_Eval(b) in the evaluation function value table in the MEM 42.

Next, for instance, at the same slot by which the pilot signal has been received, the mobile station MSe receives the notice message of the neighboring station information list from the base stations BSa and BSb in step S163 to acquire the evaluation function values BS_Eval(a) and BS_Eval(b) from the received message. The mobile station MSe then stores the acquired evaluation function values BS_Eval(a) and BS_Eval(b) in the evaluation function value table in the MEM 42. The evaluation function values BS_Eval(a) and BS_Eval(b) are values calculated so that the base stations BSa and BSb reflect the selection results in the past fixed time period, respectively.

By the way, after acquiring the evaluation function values BS_Eval(a) and BS_Eval(b), in a step 164, the mobile station MSe selects either the base station BSa or base station BSb on the basis of the measured values of the SNRs. The mobile station MSe compares the evaluation function value MS_Eval corresponding to the current radio transmission path environment calculated in advance by the self terminal with the evaluation function value BS_Eval notified from the base station for the selected base station. The mobile station MSe then determines whether the expression MS_Eval≧BS_Eval is satisfied or not. For instance, if the mobile station MSe selects now the base station BSa, it determines whether the expression MS_Eval≧BS_Eval is satisfied or not.

Figure 17:
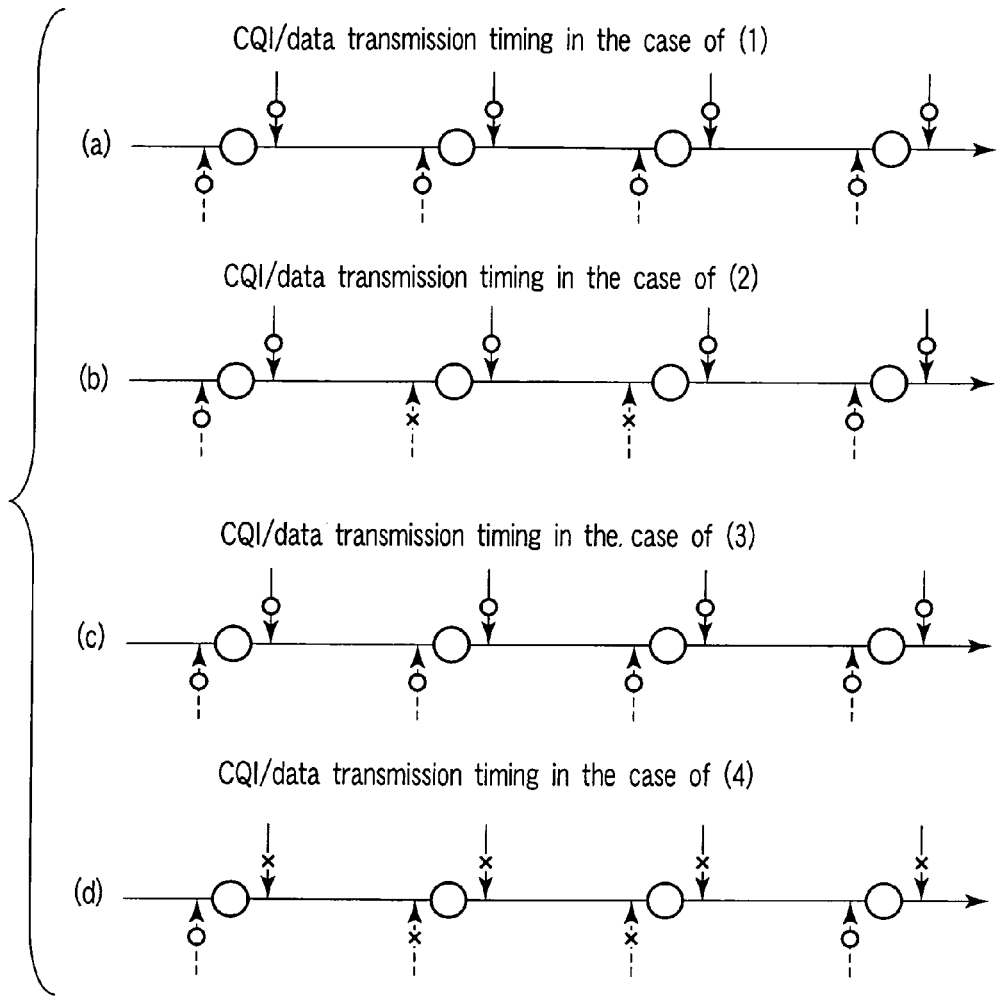
FIG. 17 is an exemplary view for explaining an operation of the CQI transmission control shown in FIG. 16.

After completing the determination of the expression MS_Eval≧BS_Eval, the mobile station MSe next determines the presence or absence of the fluctuations of the CQIs in the past fixed time period as follows. That is, at first, as the result of the determination of the expression MS_Eval≧BS_Eval, if the expression MS_Eval≧BS_Eval is established, the mobile station MSe shifts to step S165. In step S165, the mobile station MSe determines whether or not the fluctuation quantity of the CQIs, which is in the past fixed time period and stored in the MEM 42, is within the preset range. As the determination result, if the fluctuation quantity of the CQIs in the past fixed time period has exceeded the preset range, then, the mobile station MSe itself has a large possibility to be selected by the base station BSa, also determines that the quality of the downlink instantaneously varies, then, shifts to step S167 to transmit the CQIs in cycles preset from the beginning. FIG. 17(a) is the view showing the operation in step S167. Each mark "O" at the lower side in FIG. 17(a) indicates the CQI transmission and each mark "O" at the upper side therein indicates that the mobile station MSe executes to monitor whether or not the mobile station SMe, namely the self terminal has been selected.

On the contrary, as the determination result in step S165, if the fluctuation quantity of the CQIs in the past fixed time period is within the preset range, in this case, the mobile station MSe determines that there is a large possibility that the self terminal is selected by the base station BSa but the downlink quality has not fluctuated instantaneously. The mobile station shifts to step S168 to include a massage for instructing the use of the CQIs of this time instead of non-transmission for a fixed time period after that time into the CQIs to be transmitted at this time and stops the transmissions of the CQIs for the fixed time period after that time. Accordingly, in this case, the transmission cycle of the CQIs transmitted from the mobile station MSe becomes longer as shown in FIG. 17(b); thereby the number of the transmissions of the CQIs is reduced. That is, even when the expression MS_Eval(a)≧BS_Eval(a) is approved, the number of the transmissions of the CQIs is further reduced, thereby the signaling overheads in the upper link can be reduced further.

In contrast, it is presumed that the expression MS_Eval(a)<BS_Eval(a) is effected as the determination result of the expression MS_Eval(a)≧BS_Eval(a). In this situation, the mobile station MSe shifts to step S166, where it determines that whether or not the fluctuation quantity of the CQIs in the past fixed time limit stored in the MEM 42 is within the preset range. As the determination result, if the fluctuation quantity of the CQIs in the past fixed time period exceeds the preset range, the mobile station MSe determines that there is a small possibility with which the self terminals is selected by the base station BSa but there is a possibility with which the self terminal is selected instantaneously because of the instantaneous fluctuations of the downlink quality and shifts to step S169 to transmit the CQIs at the periods preset from the beginning. FIG. 17(c) shows an example of the CQI transmission timing at that time and reception timing of the information data from the base station.

On the contrary, as the determination result in step S166, it is supposed that the fluctuation quantity of the CQIs in the past fixed time period is within the preset range. In this case, the mobile station MSe has a low possibility that the self terminal is selected by the base station BSa and also determines that the downlink quality does not fluctuate instantaneously to shift to step S170. The mobile station MSe then includes the massage about the effect that it does not transmit the CQIs for a fixed time period after that time, namely the effect that it elongates the CQI transmission time period into the CQIs at this time, and stops the transmissions of the CQIs to the base station BSa for the fixed time period after that time. Accordingly, the number of the CQIs transmitted from the mobile station MSe is reduced, for example, as shown in FIG. 17(d), thereby the signaling overheads on the uplink is reduced. And in this case, the mobile station MSe, as shown by mark "X" at the upper side in the FIG. 17(d), does not execute to monitor whether or not the base station BSa selects the self terminal.

As mentioned above, in the third embodiment, the mobile station controls the transmissions of the CQIs by taking the determination result of the presence and absence of the CQI fluctuations in the past fixed time period into account in addition to the determination result of the expression of MS_Eval(a)≧BS_Eval(a). So that, it becomes possible to further appropriately control the transmission cycle of the CQIs in comparison with the case in which the transmissions of the CQIs are controlled on the basis only of the determination result of the expression of MS_Eval(a)≧BS_Eval(a). Therefore, the mobile station MSe can further improve the throughput on the uplink and increase the chance of being selected by the base station. With elongating the transmission cycle of the CQIs, the consumption power at the mobile stations MSa-MSg can be reduced.

Other Embodiment

In each of the aforementioned embodiments, the mobile terminal compares the evaluation function values MS_Eval(a) and MS_Eval(b) calculated respectively by the self terminals with the BS_Eval(a) and BS_Eval(b) notified respectively from the base station BSa as they are. However, the evaluation function values BS_Eval(a) and BS_Eval(b) notified from the base stations BSa and BSb, respectively, are the indexes acquired as the averaged value in the fixed time period, so that it is desirable to compare them by setting offsets.

As for a setting scheme for an offset, for instance, a scheme for adaptively instructing from the base stations BSa and BSb and a scheme for fixedly setting in the mobile stations MSa-MSg are possible approach. Among these schemes, the scheme for adaptively instructing from the base stations BSa and BSb may determine the magnitude of the fluctuations occurred in the evaluation function values on the basis of the calculating scheme of the evaluation function values at the base stations BSa and BSb and variably set the offset values so that the larger the fluctuations are, the larger the offset value becomes larger on the basis of the determination value of the fluctuations.

In the second embodiment, the band notifying the evaluation function value from the base station to the mobile station is set as one to transmit the CQIs. However, the invention is not limited to this; it may be constituted, for instance, as to acquire the averaged value or the central value of the evaluation function values at each chunk to transmit the averaged value or the central value of the evaluation function values. With such a constitution, the notification information quantity of the evaluation functions can be reduced.

Further, in each embodiment given above, having setting the notice cycle of the evaluation function values from the base station to the mobile station to the same as the transmission cycle of the CQIs, it is preferable to set the cycle longer than the CQI transmission cycle. For instance, when the CQI transmission cycle is set to around 1 msec, the notice cycle of the evaluation function is set, for example, to around a several hundred msec corresponding to the notice cycle of the neighbor cell list. With such a configuration, the increase in signaling overhead in the downlink due to the notifications of the evaluation functions can be reduced as much as possible.

Further, in the first embodiment, as shown in FIG. 6, after deciding the CQIs and calculating the evaluation function values for each base station in steps S61 and S62, the mobile station acquires the evaluation function values from the base stations in step S63. However, the invention is not limited to the first embodiment, and at first, the mobile station acquires the evaluation function value from the base station in step S63 in accordance with the notice cycle of the neighbor cell list. After this, the mobile station may decide the CQIs and calculate the evaluation function values for each base station in step S61 and step S62. Of course, this control procedure can be applicable as it is to FIG. 10 and FIG. 16 in the second and third embodiments, respectively.

Moreover, in the third embodiment, having described the case in which the mobile station uses one piece of resource block for each section time as the example, it is also applicable in the case in which the mobile station uses a plurality of resource blocks for each section time in a similar manner of the second embodiment.

Each of the aforementioned embodiments having included the notification of the evaluation function value BS_Eval from the base station to the mobile station into the message to notify the list of the neighboring base stations, if there is any other message to be transmitted from the base station to the mobile station, the mobile station may use the other message.

Other than this, it is possible to make a variety of modifications to implement the types of the configurations of the mobile stations and scheduling algorithms used by the base stations, the procedure of the CQI transmission control and its control content without departing from the aspect of the invention.

To put it briefly, the present invention is not limited to the aforementioned embodiments as they are, on an implementation phase, this invention may be embodied in various forms without departing from the inventive concept thereof. Various types of the invention can be formed by appropriately combining a plurality of constituent elements disclosed in the foregoing embodiments. Some of the elements, for example, may be omitted from the whole of the constituent elements shown in the embodiments above. Further, the constituent elements over different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication system comprising:
a base station; and
a plurality of radio communication terminals which transmit communication requests in a first cycle to the base station to perform communications therewith,
wherein the base station comprises:
a first calculator configured to calculate first evaluation function values for each radio communication terminal at least based on communication qualities to and from the radio communication terminals for each of the plurality of the radio communication terminals which have transmitted the communication requests;
a terminal selector configured to select a radio communication terminal at a communication destination based on the calculated first evaluation function values for each of the radio communication terminals;
a second calculator configured to calculate a second evaluation function value reflecting selection results of the radio communication terminals in a past predetermined period; and
a transmitter configured to transmit the calculated second evaluation function value to the plurality of the radio communication terminals in a cycle longer than the first cycle, and
wherein each of the plurality of the radio communication terminals comprises:
a receiver configured to receive the second evaluation function value transmitted from the base station;
a third calculator which has a same calculation algorithm as that of the first calculator and calculates a third evaluation function value for a self terminal at least based on a communication quality with the base station;
a comparator configured to compare the calculated third evaluation function value with the received second evaluation function value;
a first controller configured to transmit a communication request in the first cycle to the base station when the third evaluation function value is larger than the second evaluation function value; and
a second controller configured to stop transmission of the communication request to the base station for a period longer than the first cycle when the third evaluation function value is smaller than the second evaluation function value.

2. The radio communication system according to claim 1, wherein the second controller transmits notice information indicating a stop of transmission of the communication request for the period longer than the first cycle before stopping transmission of the communication request.

3. A radio communication system comprising:
a base station; and
a plurality of radio communication terminals which transmit communication requests in a first cycle to the base station to perform communications therewith,
wherein the base station comprises:
a first calculator configured to calculate first evaluation function values for each radio communication terminal at least based on communication qualities to and from the radio communication terminals for each of the plurality of the radio communication terminals which have transmitted the communication requests;
a terminal selector configured to select a radio communication terminal at a communication destination based on the calculated first evaluation function values for each of the radio communication terminals;
a second calculator configured to calculate a second evaluation function value reflecting selection results of the radio communication terminals in a past predetermined period; and
a transmitter configured to transmit the calculated second evaluation function value to the plurality of the radio communication terminals in a cycle longer than the first cycle, and
wherein each of the plurality of the radio communication terminals comprises:
a receiver configured to receive the second evaluation function value transmitted from the base station;
a third calculator which has a same calculation algorithm as that of the first calculator and calculates a third evaluation function value for a self terminal at least based on a communication quality with the base station;
a comparator configured to compare the calculated third evaluation function value with the received second evaluation function value;
a first determiner configured to determine whether a fluctuation in quality of a radio transmission path in a past predetermined time period is within a predetermined range or exceeds the range when the third evaluation function value is larger than the second evaluation function value;
a first controller configured to transmit a communication request in the first cycle to the base station when it is determined that the fluctuation in the quality of the radio transmission path exceeds the range; and
a second controller configured to stop transmission of the communication request to the base station for a period longer than the first cycle when it is determined that the fluctuation in the quality of the radio transmission path is within the range.

4. The radio communication system according to claim 3, further comprising:
a second determiner configured to determine whether a fluctuation in quality of a radio transmission path in a past predetermined period is within a predetermined range or exceeds the range when the third evaluation function value is smaller than the second evaluation function value; and
a third controller configured to transmit the communication request, which includes notice information indicating a change of a transmission cycle to a second cycle therein, to the base station, and then changing a transmission period of the communication request after that time into the second cycle longer than the first cycle, when it is determined that the fluctuation in the quality of the radio transmission path is within the range.

5. The radio communication system according to claim 3, wherein the second controller transmits notice information indicating maintenance of contents of the communication request for the period longer than the first cycle before stopping transmission of the communication request.

6. A radio communication terminal used in a radio communication system which comprises a base station and a plurality of radio communication terminals that transmit communication requests in a first cycle to the base station to perform communications therewith, wherein the base station comprises: (i) a first calculator configured to calculate first evaluation function values for each radio communication terminal at least based on communication qualities to and from the radio communication terminals for each of the plurality of the radio communication terminals which have transmitted the communication requests; (ii) a terminal selector configured to select a radio communication terminal at a communication destination based on the calculated first evaluation function values for each of the radio communication terminals; (iii) a second calculator configured to calculate a second evaluation function value reflecting selection results of the radio communication terminals in a past predetermined period; and (iv) a transmitter configured to transmit the calculated second evaluation function value to the plurality of the radio communication terminals in a cycle longer than the first cycle, wherein each radio communication terminal comprises:

a receiver configured to receive the second evaluation function value transmitted from the base station;

a third calculator which has a same calculation algorithm as that of the first calculator and calculates a third evaluation function value for a self terminal at least based on a communication quality with the base station; and a comparator configured to compare the calculated third evaluation function value with the received second evaluation function value;

a first controller configured to transmit a communication request in the first cycle to the base station when the third evaluation function value is larger than the second evaluation function value; and a second controller configured to stop transmission of the communication request to the base station for a period longer than the first cycle when the third evaluation function value is smaller than the second evaluation value.

7. The radio communication terminal according to claim 6, wherein the second controller transmits notice information indicating a stop of transmission of the communication request for the period longer than the first cycle before stopping transmission of the communication request.

8. The radio communication terminal according to claim 6, wherein, when a downlink from the base station to a mobile station comprises a plurality of chunks:

the receiver receives the second evaluation function value calculated for each chunk from the base station, the third calculator calculates the third evaluation function value for each chunk, the comparator compares the calculated third evaluation function value with the received second evaluation function value for each chunk, the first controller selects a chunk, the third evaluation function value of which is larger than the second evaluation function value thereof, and transmits a communication request to the base station in the first cycle with respect to the selected chunk, and the second controller stops transmission of the communication request to the base station for the period longer than the first cycle when the chunk, the third evaluation function value of which is larger than the second evaluation function value thereof does not exist.

9. A radio communication terminal used in a radio communication system which comprises a base station and a plurality of radio communication terminals that transmit communication requests in a first cycle to the base station to perform communications therewith, wherein the base station comprises: (i) a first calculator configured to calculate first evaluation function values for each radio communication terminal at least based on communication qualities to and from the radio communication terminals for each of the plurality of the radio communication terminals which have transmitted the communication requests; (ii) a terminal selector configured to select a radio communication terminal at a communication destination based on the calculated first evaluation function values for each of the radio communication terminals; (iii) a second calculator configured to calculate a second evaluation function value reflecting selection results of the radio communication terminals in a past predetermined period; and (iv) a transmitter configured to transmit the calculated second evaluation function value to the plurality of the radio communication terminals in a cycle longer than the first cycle, wherein each radio communication terminal comprises:

a receiver configured to receive the second evaluation function value transmitted from the base station;

a third calculator which has a same calculation algorithm as that of the first calculator and calculates a third evaluation function value for a self terminal at least based on a communication quality with the base station; and a comparator configured to compare the calculated third evaluation function value with the received second evaluation function value;

a first determiner configured to determine whether a fluctuation in quality of a radio transmission path in a past predetermined time period is within a predetermined range or exceeds the range when the third evaluation function value is larger than the second evaluation function value;

a first controller configured to transmit a communication request in the first cycle to the base station when it is determined that the fluctuation in the quality of the radio transmission path exceeds the range; and a second controller configured to stop transmission of the communication request to the base station for a period longer than the first cycle when it is determined that the fluctuation in the quality of the radio transmission path is within the range.

10. The radio communication terminal according to claim 9, further comprising:

a second determiner configured to determine whether a fluctuation in quality of a radio transmission path in a past predetermined period is within a predetermined range or exceeds the range when the third evaluation function value is smaller than the second evaluation function value; and a third controller configured to transmit the communication request, which includes notice information indicating a change of a transmission cycle to a second cycle therein, to the base station, and then changing a transmission period of the communication request after that time into the second cycle longer than the first cycle, when it is determined that the fluctuation in the quality of the radio transmission path is within the range.

11. The radio communication terminal according to claim 9, wherein the second controller transmits notice information indicating maintenance of contents of the communication request for the period longer than the first cycle before stopping transmission of the communication request.

12. The radio communication terminal according to claim 8, wherein before stopping transmission of the communication request, the second controller transmits one of information announcing that a transmission request is not transmitted in the first cycle and information announcing that a request for a dedicated information channel is not transmitted.

13. The radio communication terminal according to claim 8, wherein when a number of selected chunks is larger than a predetermined maximum number, the first controller selects the maximum number of chunks from the selected chunks in descending order of magnitude of difference between the third evaluation function value and the second evaluation function value thereof, and transmits communication requests to the base station in the first cycle with respect to the selected maximum number of chunks.

* * * * *